United States Patent [19]
Koch

[11] Patent Number: 4,592,634
[45] Date of Patent: Jun. 3, 1986

[54] APPARATUS TO SEPARATE A SINGLE SHEET FROM A STACK OF SEVERAL SIMILAR SHEETS

[75] Inventor: Carl Koch, Stetten, Switzerland

[73] Assignee: Sinar AG Schaffhausen, Feuerthalen, Switzerland

[21] Appl. No.: 606,145

[22] Filed: May 2, 1984

[30] Foreign Application Priority Data

May 2, 1983 [CH] Switzerland ............. 2359/83

[51] Int. Cl.⁴ .............. B65H 3/46; G03B 17/24; G03B 19/10
[52] U.S. Cl. .................... 354/105; 221/265; 271/134; 271/135; 271/137; 271/140; 271/165; 354/174; 414/129; 414/131
[58] Field of Search ........... 354/107, 108, 174, 105; 271/131, 133, 134, 135, 137, 139, 140, 165; 414/129, 131; 221/264, 265

[56] References Cited

U.S. PATENT DOCUMENTS 2,503,239 4/1950 Antos .
4,013,193 3/1977 Lorsch ............... 221/264
4,153,365 5/1979 English et al. ............ 354/108 X

FOREIGN PATENT DOCUMENTS 2445338 of 0000 Fed. Rep. of Germany .
2934986 3/1981 Fed. Rep. of Germany ...... 354/108

Primary Examiner—Michael L. Gellner
Attorney, Agent, or Firm—Watson, Cole, Grindle & Watson

[57] ABSTRACT

Disclosed is an apparatus for separating a single sheet from a stack of several sheets having the same non-round shape and the same size. The apparatus comprises a container with a recess for holding the stack, a base located underneath the container having a dispensing opening, a separating element with an aperture for receiving the bottom sheet which is to be separated from the stack. The separating element is located between the container and the base and is essentially a flat disc, the thickness of which is smaller than the thickness of a single sheet of the stack. Structure is provided for the container relative to the separating element on an imaginary axis passing through the recess of the container. The dispensing opening of the base and the aperture of the separating element are capable of separating each bottom sheet from the stack and conveying the separated sheet into the dispensing opening of the base. The recess of the container and the aperture of the separating element conform essentially in shape and size to one another and are of the same shape and size of the sheets of the stack when viewed in the direction of the imaginary axis. The apparatus may be provided with at least one support element which is capable of supporting the bottom sheet of the stack and/or with a marking device for applying marks to the bottom sheet as it is separated and dispensed.

8 Claims, 9 Drawing Figures

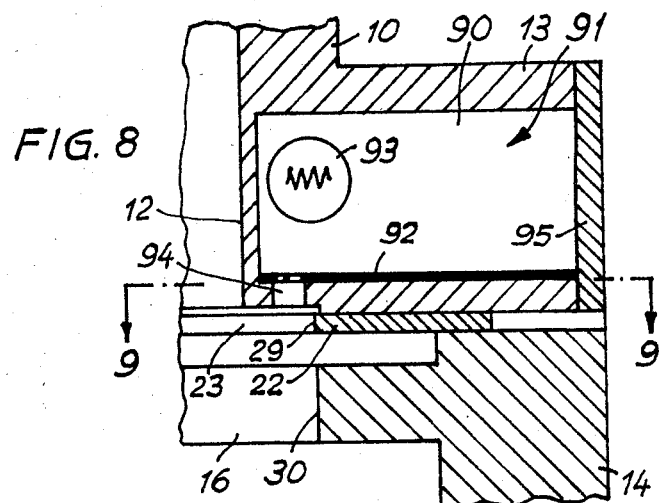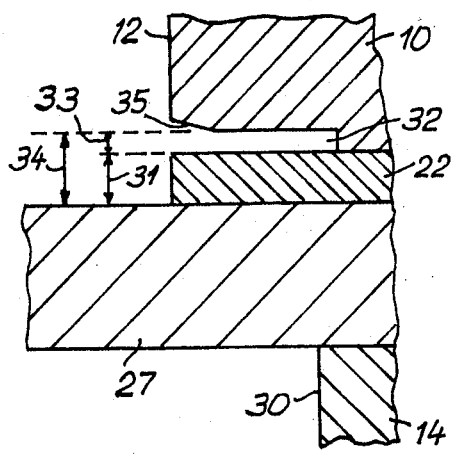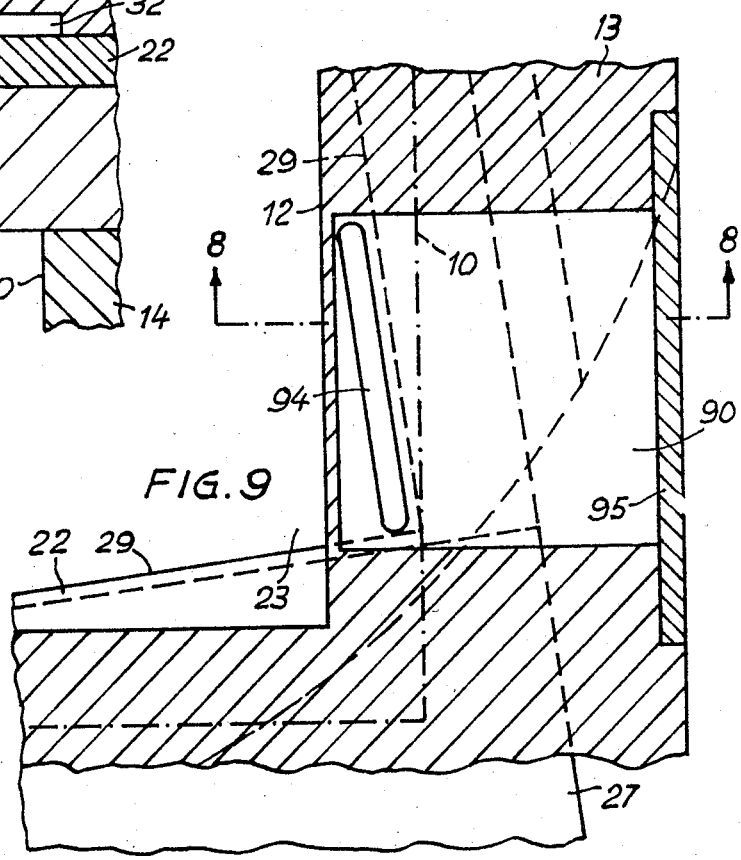

APPARATUS TO SEPARATE A SINGLE SHEET FROM A STACK OF SEVERAL SIMILAR SHEETS

BACKGROUND OF THE INVENTION

The present invention relates generally to an apparatus for separating a one non-round sheet from a stack of identical sheets and particularly to an apparatus for separating film sheets used for photographic purposes.

More specifically, the invention relates to an apparatus which comprises a container with a recess for holding the stack, a base with a dispensing opening located beneath the container, a separating element with an aperture for receiving the bottom sheet that is to be separated from the stack, the separating element being located between the container and the base and being essentially a flat disc, the thickness of which is smaller than the thickness of a single sheet of the stack, and means for causing a relative rotation between the container and the separating element around an imaginary axis passing through the recess of the container. The dispensing opening of the base and the aperture of the separating element are capable of separating each bottom sheet from the stack and conveying the separated sheet into the dispensing opening of the base, and the recess of the container and the aperture of the separating element conform essentially in shape and size to one another and of the same shape and size of the sheets of the stack when viewed in the direction of the imaginary axis.

Apparatus of this general type are known, for example, from the German published patent application No. 24 45 338 and U.S. Pat. Nos. 4,013,193 and 2,503,239. These apparatus were previously used for removing a single object such as framed photographic slides from a stack of like objects. However, such objects are relatively thick in comparison to their size and are resistant to bending. Substantial difficulties arise if a device of the known type is used to separate a single sheet from a stack of relatively thin sheets that are only slightly resistant to bending, such as film sheets for photographic purposes, for example. The cited difficulties occur for the most part as a result of the gravitationally induced sagging of the middle or central portion of a thin sheet that is supported only by its corners. In such a situation, the corners of the sheet point diagonally upwards, which in general can severely hamper the separation and dispensing procedure produced by the relative rotation between the separating element and the container or even make the procedure quite impossible.

For the reasons described, apparatus of the type noted above have not been used previously for separating and dispensing relatively thin sheets that have little resistance to bending, such as photographic film sheets. Instead, apparatus have been used in which each sheet to be separated from the stack is moved parallel to an edge of the sheet by means of the separating element. As a consequence, the apparatus has a relatively long transport path for the sheet to be separated and a correspondingly large power requirement for the separation procedure. In addition, the long transport path necessitates corresponding large dimensions for the apparatus and the apparatus is therefore relatively bulky and heavy. To alleviate the above-noted disadvantages, apparatus have also been produced in which the sheet to be separated from the stack is folded during the separation procedure. This is disadvantageous in certain cases, however, because the separated sheet is no longer flat, which can lead to a dulled image if the sheet is a film sheet used for photographic purposes. In the better known apparatus for dispensing individual film sheets, there is, in addition, the danger that as a result of the relatively long transport path or the bending of the separated sheet, surface scratches and electric charges will occur. Such electric charges, as is well known, give rise to electrostatic forces, which in turn render handling of the separated sheet much more difficult and can attract dust particles which may lead to surface scratches on the separated sheet and to visible defects in the photographic image.

SUMMARY OF THE INVENTION

An object of the invention therefore is to provide an apparatus that does not have the disadvantages of known apparatus that have been described and is suitable for separating each individual sheet from a stack of sheets that are relatively thin in relation to their other dimensions and have little resistance to bending such as, for example, photographic film sheets. In particular, the invention provides an apparatus of the type mentioned at the outset in which the separating and dispensing of each bottom sheet of the stack occurs through relative rotation between the separating element and the container which is adapted for the secure handling of relatively thin sheets that have little resistance to bending.

This object is achieved by the apparatus according to the present invention which is of the above-described type and which further includes at least one support element that can be moved into an operating position and into a non-operating position which is located on the bottom of the separating element away from the container, which is capable of supporting each bottom sheet of the stack, especially the middle of the sheet, in its operating position and which opens the passage for the bottom sheet from the aperture of the separating element into the dispensing opening of the base in its non-operating position, the movement of the support element from its operating position to its non-operating position and vice-versa being coupled with the relative rotation between the separating element and the container.

Details and advantages of the invention and appropriate, preferred embodiments will become apparent from the following description of examples of applications and from the accompanying drawings in which the invention is portrayed in a purely illustrative manner.

BRIEF DESCRIPTION OF THE DRAWINGS

FIG. 3 depicts a detail of FIG. 1 on a larger scale;

FIG. 8 schematically shows a partial variation of the first embodiment in a vertical section along the line 8—8 in FIG. 9; and FIG. 9 is a horizontal section along the line 9—9 in FIG. 8.

Figure 1:
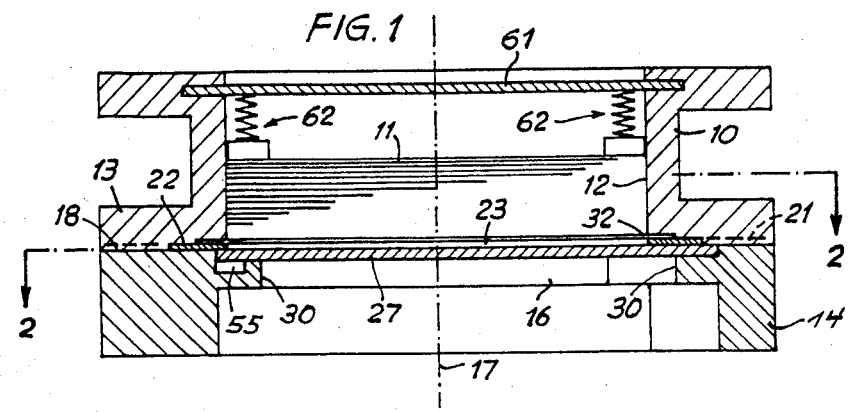
FIG. 1 schematically shows an embodiment of the apparatus according to the invention in a vertical cross-section along the line 1—1 in FIG. 2.
Figure 2:
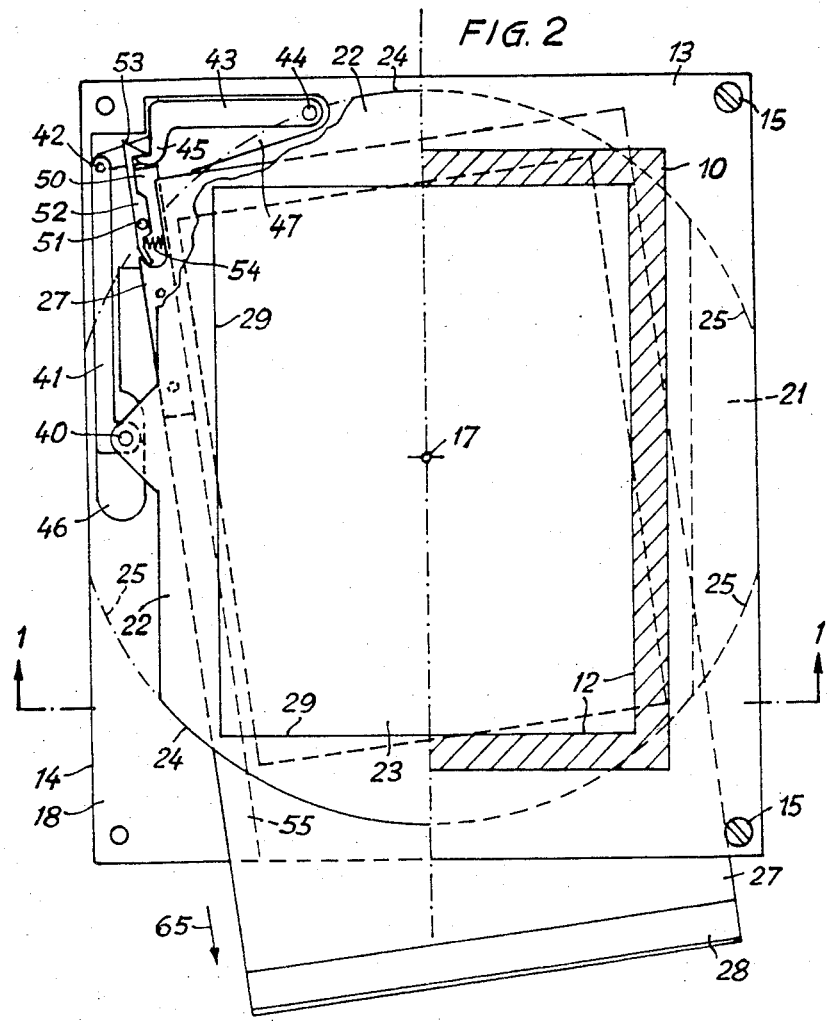
FIG. 2 portrays the same apparatus in two horizontal sections along the line 2—2 in FIG. 1.

The apparatus illustrated in FIGS. 1 to 3 comprises container 10 for receiving stack 11 made up of a plurality of rectangular sheets having the same shape and size. Vertical inner contact surfaces 12 of container 10 serve as guides for the edges of the individual sheets forming stack 11. The open horizontal cross-section of container 10 is dimensioned to be the same as that of the individual sheets of stack 11. The bottom of container 10 is open and has external flange 13 supported on base 14 and connected thereto by means such as screws 15. Base 14 has rectangular opening 16 which conforms in the plan view to the shape and size of the open horizontal cross-section of container 10, but has a position rotated in relation to the cross-section of the container as is shown in FIG. 2. The midpoint of opening 16 and the open horizontal cross-section of container 10 lie on imagined vertical axis 17. A suitable angular rotation for opening 16 of base 14 relative to the open horizontal cross-section of container 10 is an angle in the range from about 8 degrees to about 15 degrees.

Between flat upper side 18 of base 14 and container 10 is shallow recess 21 formed in flange 13 of container 10. Located within recess 21 is essentially disc-shaped separating element 22, having aperture 23, the aperture conforming in shape and size with the open horizontal cross-section of container 10 and with opening 16 of base 14. Separating element 22 can be rotated around an imaginary axis which is identical with the previously mentioned vertical axis 17. As is shown in FIG. 2, separating element 22 has convex guide surfaces 24 along the arc around axis 17 to assist rotatable mounting and guidance, and the periphery of recess 21 has corresponding concave guiding surfaces 25 on which the convex guiding surfaces of the separating element slide.

A slide plate 27, the top surface of which is at the same height as top 18 of base 14 and is directly contiguous to the bottom of separating element 22, is movably positioned in the base. One end of slide plate 27, which is provided with handle 28, always protrudes toward the exterior of the apparatus so that the slide plate can be operated manually. As shown in FIG. 2, slide plate 27 is constructed and located such that it completely closes aperture 23 in separating element 22 as well as opening 16 of base 14 when in its pushed-in and operating final position. In this final position, slide plate 27 functions as a support element, for supporting each bottom sheet of stack 11. In the pulled-out and non-operating final position of slide plate 27, the plate being held in position by a detent (not shown), the slide plate completely opens aperture 23 of separating element 22 and opening 16 of base 14.

In a manner hereinafter described, separating element 22 can be rotated back and forth between a first and a second final position, during the course of which contact surfaces 29 of aperture 23 of the separating element are aligned with inner contact surfaces 12 of container 10 in the first final position and with contact surfaces 30 of opening 16 in the base 14 in the second final position. In other words, by rotating separating element 22 into the first or second final position, aperture 23 of the separating element can be brought into a position conforming with the open horizontal cross-section of container 10 or with opening 16 of base 14, respectively.

Aperture 23 of separating element 22 is intended to receive each bottom sheet of stack 11. The thickness of each individual sheet can vary between a minimum and a maximum value since certain tolerances for the resulting thickness have to be allowed for in the manufacture of the sheets. To insure that only one single sheet occupies aperture 23 of separating element 22, the two parallel, horizontal surfaces of the separating element have a distance 31 from one another (see FIG. 3) that, at the most, is equal to the thickness of the minimum thickness of a single sheet from stack 11. While the bottom flat surface of separating element 22 rests directly on the flat upper side of slide plate 27, there is clearance 32 (see FIGS. 1 and 3) between the upper flat surface of the separating element and the bottom end of inner contact surface 12 of container 10. The open width 33 of clearance 32 measured in a vertical direction is less than distance 31 between the two parallel flat surfaces of separating element 22. The sum 34 (see FIG. 3) of specified distance 31 and open width 33 of clearance 32 is less than double the previously mentioned minimum thickness but greater than the maximum thickness of a single sheet of stack 11. It is possible but not necessary to expand clearance 32 like a funnel toward inner contact surfaces 12 of container 10, as is shown in FIG. 3 at 35.

According to FIG. 2, separating element 22 is linked by means of link pin 40 with the end of coupling rod 41. The other end of coupling rod 41 is connected to pivot arm 43 by means of second link pin 42. Pivot arm 43 is mounted on pin 44 and includes hook-shaped portion 45. The components designated 40 to 45 are located in the recesses 46 and 47 of base 14 and under flat upper side 18 of the base. Fastened on the underside of one corner of slide plate 27 is strip 50 on which two-armed lever 52 is swivelly mounted by means of pin 51. One end of lever 52 is formed into hook 53, which is designed to work in conjunction with the hook-shaped portion 45 of pivot arm 43. The other arm of lever 52 is acted on by spring 54 which urges lever 50 into a position in which hook 53 is locked with the hook-shaped portion 45 of pivot arm 43, or at least can engage it. Strip 50 slides into groove 55 formed on base 14, and elements 51 to 54 lie beneath the plane defining the upper side of slide plate 27, which coincides with flat upper side 18 of the base.

As shown in FIG. 1, lid 61 in the form of a slide plate is located on the upper side of container 10. Between lid 61 and the top sheet of stack 11 are spring-loaded devices 62 (only shown schematically) for holding down the stack. These clamping or pressing devices 62 are constructed and located such that they only press on the corners of each top sheet of stack 11.

The manner of use and operation of the apparatus described with reference to FIGS. 1 to 3 is briefly as follows:

Container 10 is first loaded with stack 11 consisting of a plurality of sheets of the same shape and size, and slide plate 27 is in its pushed-in position according to FIGS. 1 and 2. Rotatable separating element 22 is in its final position as shown in FIG. 2 where contact surfaces 29 of the aperture 23 of separating element 22 are aligned with corresponding inner contact surfaces 12 of container 10. In this position of separating element 22, the bottom sheet of stack 11 lies within aperture 23 of the separating element and on the top of slide plate 27 which supports the whole bottom sheet and keeps the sheet from sagging and bending.

In order to separate the bottom sheet from stack 11, the user pulls slide plate 27 by means of handle 28 in the direction of arrow 65 in FIG. 2 until the slide plate completely frees opening 16 of base 14. During this movement of slide plate 27, pivot arm 43 is swivelled counter-clockwise by means of hook 53 and a rotary motion is imparted to separating element 22 via coupling rod 41. As soon as separating element 22 has reached its end position in which contact surfaces 29 of aperture 23 are aligned with contact surfaces 30 of opening 16 of the base, hook 53 disengages from hook-shaped portion 45 of pivot arm 43 and thus further rotation of separating element 22 is prevented while the extraction movement of slide plate 27 is completed. During the rotary motion that has been described of the separating element 22, the sheet lying in aperture 23 of separating element is also rotated relative to the remainder of sheets of stacks 11, during which contact surfaces 29 of the aperture 23 work together with the edges of the sheet designated as pulling faces. If the thickness of the sheet lying within aperture 23 exceeds the distance 31 (see FIG. 3) between the two parallel flat surfaces of the separating element, the sheet enters partially into free clearance 32 as the separating element rotates, so that the rotation of separating element 22 and the sheet lying in its aperture 23 is not hampered. The sheet rotated by means of separating element 22 finally falls through opening 16 of base 14 if slide plate 27 has completely unblocked this opening. While this procedure is occurring, the next sheet of the stack is now supported by a portion of the upper flat surface of the now rotated separating element 22. Thereafter, slide plate 27 is pushed back into its initial position by means of handle 28, in the course of which the forward end of strip 50 fastened on the slide plate pushes against hook-shaped portion 45 of the pivot arm 43 and swings the arm back into its initial position as is shown in FIG. 2. Hook 53 automatically engages hook-shaped portion 45 due to spring 54. By the swinging back of pivot arm 43, separating element 22 is rotated back into its first final position. As soon as this final position is reached, the new bottom sheet of stack 11 slides into the aperture 23 of separating element 22, after which it comes to rest on slide plate 27. The apparatus is then again in its starting position. The sheet that was removed from stack 11 by means of separating element 22 and dispensed through opening 16 of base 14 can then be conveyed to its designated use.

The apparatus described has a number of advantages over known devices that serve the same purpose, the most important of which are the following:

Aside from the relatively small rotational movement of each bottom sheet of the stack 11 necessary for the separation procedure, the transport of the sheet separated from the stack through dispensing opening 16 of base 14 occurs automatically through the force of gravity alone which thereby makes additional transport mechanisms unnecessary. The movement of the separated sheet with relation to the following sheet of stack 11 is relatively small, and consequently the friction created by the sheets moving against each other is relatively slight. When the sheets are photographic sheets having emulsion layers on the top surface, the danger of scratches occurring on the upper surface of the emulsion layer of the sheet that is separated and dispensed is extraordinarily slight.

The forces exerted by pressing devices 62 on stack 11 are limited to the corners of the sheets of the stack. Hence any frictional forces that operate on the bottom sheet during the separation procedure are concentrated at the corners of this sheet. As a consequence, the greater portion of the sheet surface is largely spared the potentially harmful effects of friction and the power required for the overall separation procedure is relatively small.

In the rest position of the apparatus, slide plate 27 serving as a support element prevents the sheets of stack 11 from sagging in the middle and thus causing the corners to turn up which would hamper the separating and dispensing procedure. In addition, during the sheet separating and dispensing procedure, the separated sheet remains flat, which is of substantial importance, particularly for film sheets for photographic purposes where flatness of the light-sensitive layers is necessary for achieving an even, high image sharpness.

Since opening 16 for dispensing the separated sheet practically forms a vertical continuation of container 10 for stack 11, a relatively compact and simple design of the apparatus is possible. Therefore, the apparatus occupies relatively little space, generally a space which is only slightly larger than the space occupied by stack 11 alone.

Figure 4:
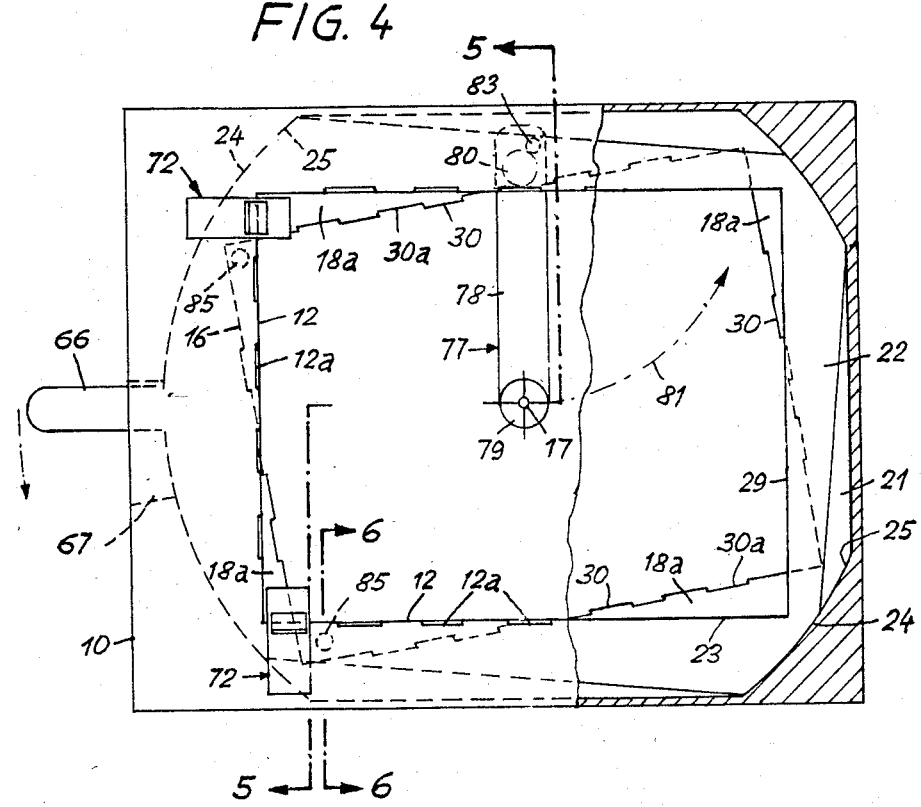
FIG. 4 shows another embodiment of the apparatus according to the invention in a plan view and partially in horizontal section along the line 4—4 in FIG. 5.

A second embodiment of the apparatus in accordance with the invention as is shown in FIGS. 4 to 7 differs from the embodiment of FIGS. 1 to 3 essentially as follows:

Container 10 adapted to receive stack 11 has only a relatively shallow depth, sufficient for 30 to 50 sheets, for example. Container 10 is made of a flat frame which is solidly connected to base 14. Because of the rotated position of opening 16 in base 14, triangular portions 18a of its upper surface 18 lie within the plan view of contact surfaces 12 of container 10 as shown in FIG. 4. These triangular surface portions 18a serve as support shoulders for supporting each bottom sheet of stack 11. Inner contact surfaces 12 of container 10 and contact surfaces 30 of opening 16 in base 14 are provided with vertically running grooves 12a or 30a which facilitate equalization of the air pressure between the bottom and top of the sheets of the stack.

Separating element 22 is provided with radial, outwardly extending arm 66 which protrudes through slit 67 and serves to rotate the separating element. By means of arm 66, separating element 22 can be manually turned back and forth between a first and second final position. In the first final position, contact surfaces 29 of aperture 23 of separating element 22 are aligned with inner contact surfaces 12 of container 10, while in the second final position, the contact surfaces of the aperture are aligned with contact surfaces 30 of dispensing opening 16 in base 14.

Figure 5:
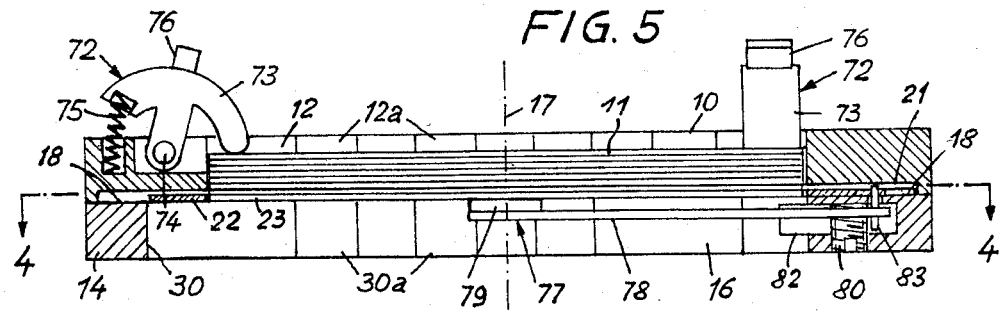
FIG. 5 is a vertical cross-section along the line 5—5 in FIG. 4 on a larger scale.
Figure 6:
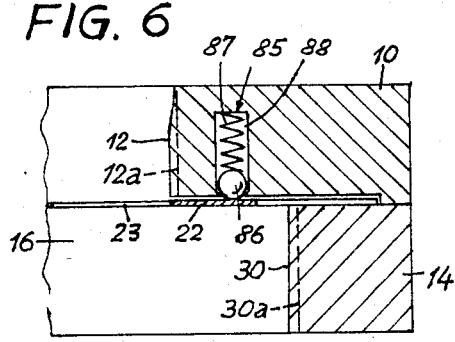
FIGS. 6 and 7 show, on a larger scale, a partial cross-section along the line 6—6 in FIG. 4, FIG. 6 showing the apparatus in the state of rest and FIG. 7 showing the apparatus during the separating and dispensing procedure.
Figure 7:
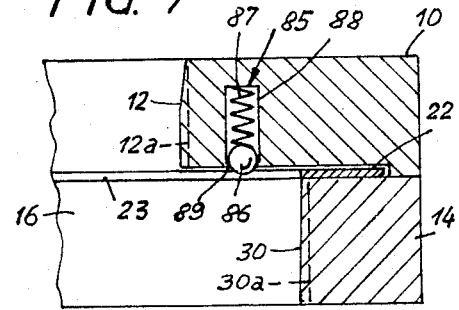

Container 10 has four similar pressure devices 72, each of which, as is shown in FIG. 5, has anchor-shaped body 73 swivelly mounted by means of axle pin 74. One arm of body 73 is acted on by compression spring 75 which urges the body to swing such that its other arm presses against the top sheet of stack 11. Projection 76 on body 73 serves as a grip for manually swinging the body against the force of spring 75 in order to insert a new stack 11 in container 10. The four pressure devices 72 are oriented such that each of them presses on a different corner of the top sheet of stack 11.

Slide plate 27 of the first embodiment for supporting each bottom sheet of stack 11 is not included in the embodiment according to FIGS. 4 to 7. Instead, middle support 77 which can be moved in and out of operating position is provided under separating element 22. Middle support 77 prevents the central portion of the sheets of stack 11 from sagging down and the corners of the sheets from turning up when these sheets have relatively little resistance to bending in comparison with their size. Support 77 consists of swivel arm 78 and a support disc 79 fastened to the arm. Arm 78 is swively mounted on base 14 by means of screw bolt 80, the screw threads of which engage the corresponding inner threads of a tap-hole in the arm. The screw threads of bolt 80 and the tap-hole of arm 78 are designed such that middle support 77 simultaneously makes a movement away from the bottom sheet while it swings as indicated by arrow 81 in FIG. 4. Base 14 includes recess 82 on one side (see FIG. 5) which receives middle support 77 in its non-operating position so that the middle support does not hamper the passage of each separated sheet through dispensing opening 16. Vertically disposed driving pin 83 is fastened on separating element 22. Driving pin 83 slides into a tap-hole in arm 78 and is located such that, while separating element 22 is rotating from its first final position to its second final position or vice versa, middle support 77 is automatically pivoted by about 90 degrees in the direction of arrow 81 or vice-versa.

The frame constituting container 10 is also provided with four ejection devices 85 (see FIGS. 4, 6 and 7) for ejecting the sheet lying in aperture 23 of the separating element into dispensing opening 16 of base 14. Devices 85 are located near the corners of the open horizontal cross-section of container 10 and each device constists of ball 86 and coiled spring 87 housed in vertical tap-hole 88. Under the pressure of spring 87, ball 86 is pressed against the open lower end of tap-hole 88. Crimping flange 89 (see FIG. 7)in the mouth of tap-hole 88 prevents ball 86 from completely escaping from the tap-hole.

In all other respects, the apparatus according to FIGS. 4 to 7 is constructed like the embodiment described with reference to FIGS. 1 to 3.

The manner of use and operation of the apparatus in accordance with FIGS. 4 to 7 are briefly as follows:

Initially, stack 11 consisting of several sheets of the same shape and size is in container 10 and rotatable separating element 22 is in its final position as seen in FIG. 4 where contact surfaces 29 of aperture 23 of the separating element are aligned with corresponding inner contact surfaces 12 of the container. In this position of separating element 22, the bottom sheet of stack 11 lies within aperture 23 of the separating element and on portions 18a of upper surface 18 of the base that serve as support shoulders. By means of pressure devices 72 stack 11 is pressed on the mentioned support shoulders of portions 18a. In the final position of separating element 22, middle support 77 assumes its operating position as shown in FIGS. 4 and 5 where support disc 79 supports the middle of the bottom sheet of stack 11 and thereby prevents this bottom sheet and the remainder of the sheets of the stack from sagging. Ball 86 of ejection device 85 rests directly on the top flat surface of separating element 22 and thus has no effect on the sheets of stack 11 in this final position of the separating element.

In order to separate the bottom sheet from stack 11, separating element 22 is rotated by arm 66 into its other final position where contact surfaces 29 of the aperture 23 of the separating element are aligned with the corresponding contact surfaces 30 of dispensing opening 16 in base 14. During this rotation of separating element 22, middle support 77 is automatically swivelled by driving pin 83 in the direction of arrow 81 in FIG. 4 to a non-operating position in recess 82 of the base 14. Simultaneously with this swivelling, the middle support 77 also experiences a downward movement due to its placement on bolt 80. As a consequence, any fricton created by movement of support disc 79 relative to the underside of the bottom sheet of stack 11 is practically avoided. During the rotation of separating element 22, the sheet lying in aperture 23 of the separating element is also turned with relation to the rest of stack 11. As soon as separating element 22 reaches its second final position, the position of aperture 23 coincides with the position of dispensing opening 16 in base 14 and the sheet lying in the aperture falls through the opening. The release of the sheet from aperture 23 of separating element 22 is facilitated by the action of ejection devices 85. More specifically, as soon as separating element 22 rotates beneath balls 86 of devices 85, the balls come to rest directly on the corners of the sheet lying in aperture 23 of the separating element and thereafter the sheet is pushed down out of the aperture under the pressure of springs 87 bearing against the balls. The grooves 30a in contact surfaces 30 of dispensing opening 16 of base 14 permit the passage of air from the underside to the top of the separated sheet thereby facilitating the release of the bottom sheet from the rest of stack 11 since the separated sheet is not prevented from passing through dispensing opening 16 by an air cushion forming underneath the sheet. When separating element 22 reaches its second final position, the following sheet of stack 11 is supported by portions of the upper flat surface of the separating element.

Subsequently, separating element 22 is turned back to its first final position by arm 66, and at the same time, middle support 77 is pivoted automatically in a direction opposite arrow 81 (see FIG. 4) into its operating position by driving pin 83 and is moved upwardly by screw bolt 80. As soon as the first final position of separating element 22 is again reached, the upper side of support disc 79 of middle support 77 is at the level of support shoulders 18a and slides the new bottom sheet of stack 11 into the aperture 23 of the separating element until the sheet rests upon support shoulders 18a and on the middle support. The apparatus is then again in its starting position. The sheet that was removed from stack 11 by separating element 22 and dispensed through dispensing opening 16 of base 14 can then be conveyed to its intended use.

The second embodiment of the apparatus according to the invention that has just been described has the following advantages in addition to those listed with relation to the first embodiment:

Pressure devices 72 can be conveniently swung to the outside and, if necessary, locked in the swung-out position to allow for simple loading of a stack in the container 10. Grooves 12a in inner contact surfaces 12 of the container 10 facililitate the loading of stack 11 since the grooves allow the escape of the air from beneath the stack. Since the downward or upward motion of the middle support 77 occurs simultaneously with the rotation of the middle support, the danger of scratches being made on the underside of each bottom sheet is minimal. Ejection devices 85 facilitate and accelerate the exit of the sheet lying in aperture 23 of separating element 22 at the end of the separating and dispensing procedure, and grooves 30a of contact surfaces 30 of dispensing opening 16 in base 14 permit the air pressure below and above the separated sheet to be equalized rapidly so that the separating and dispensing procedure is effectively accelerated.

The arm of anchor-shaped body 73 of each pressure device 72 which pressed on the upper sheet of stack 11 will engage aperture 23 of the separating element 22 after the last sheet of stack 11 has been dispensed and the separating element has been rotated back to its first final position. Further rotation of separating element 22 towards its second final position is no longer possible until pressure devices 72 are swung back and new stack 11 loaded into container 10. Thus, pressure devices 72 automatically block separating element 22 after all of the sheets of stack 11 are dispensed. As a consequence, empty operations and errors by the user of the apparatus can be avoided. The same advantage can also be achieved with pressure devices 62 of the previously described first embodiment of the invention.

FIGS. 8 and 9 illustrate schematically a partial varient of the first embodiment in accordance with FIGS. 1 to 3. In the illustrated variation, marking device 91 is provided in recess 90 of flange 13 of container 10, the marking device capable of making photographic markings such as, for example, date, time, copyright data and the like, on the light-sensitive layer of each bottom sheet to be dispensed from stack 11 of photographic sheets. In accordance with FIG. 8, marking device 91 includes a mask 92 with translucent and opaque portions and light source 93 which sends light rays through the translucent portions of the mask and through slit-like opening 94. Marking device 91 is located exteriorly of the inner chamber of the container 10 that contains stack 11 but above a corner of dispensing opening 16 of the base 14. Thus when separating element 22 is rotated into its second final position which thereby separates and dispenses the bottom sheet of stack 11, an edge of aperture 23 of the separating element ends up under opening 92 as is portrayed in FIGS. 8 and 9. Suitable means (not shown) may be provided which briefly turns on light source 93 at the moment when separating element 22 assumes its second final position. The recess 90 in flange 13 that houses marking device 91 is closed with removable lid 95 which allows access for replacing light source 93 and/or mask 92. It is preferred to use an electronic flash unit as light source 93.

The manner of use and operation of the embodiments according to FIGS. 8 and 9 are as follows:

Initially container 10 of the apparatus is loaded with stack 11 consisting of photographic sheets, each of which has a light-sensitive layer facing up and separating element 22 is in its first final position in which contact surfaces 29 of the aperture 23 are aligned with inner contact surfaces 12 of the container. At this point, the bottom sheet of stack 11 lies in aperture 23 of separating element 22 and is supported by slide plate 27, as was described in detail with reference to FIGS. 1 and 2. In order to separate and dispense the bottom sheet of stack 11, slide plate 27 is actuated and separating element 22 is thereby rotated into its second final position in accordance with FIGS. 8 and 9 so that contact surfaces 29 of aperture 23 are aligned with contact surfaces 30 of dispensing opening 16 of the base 14 and the bottom sheet of the stack is turned along with them. Just before the second final position is reached, light source 93 is briefly turned on and the translucent portions of mask 92 are thereby projected on a border of the light-sensitive layer of the separated sheet. Thereafter, the separated sheet slides through dispensing opening 16 of base 14. Finally, slide plate 27 and separating element 22 are rotated back into the starting position whereupon the new bottom sheet of stack 11 slides into aperture 23 of the separating element.

It is within the scope of the invention to mount two marking devices 91 diametrically opposite one another in relation to imaginary axis 17 in order to make a greater number of markings on the edges of the sheet being dispensed. In particular, marking device 91 can be designed identically with, or similar to, the known dating devices used in photographic cameras. Furthermore, it is possible to design mask 91 so that it can be exchanged or adjusted from the exterior and portions of mask 91 can also be adjustable with the time of day. One or more marking devices of the type described can also be used in the embodiment of the apparatus according to the invention as shown in FIGS. 4 to 7.

All of the embodiments of the invention that have been described can be modified such that imaginary axis 17 around which separating element 22 and container 10 can be rotated has a position different from the vertical central axis of the container. In any case, however, imaginary axis 17 must run inside container 10 and dispensing opening 16 of base 14. In a variant of the first embodiment that is not portrayed, container 10 and base 14 connected thereto can be rotated rather than separating element 22 being rotated since what matters is only the relative rotation between the container and the separating element.

The extent of the relative rotation between container 10 and separating element 22, i.e., the angle of rotation between the first and the second final position of the separating element or the container, is determined by the format and resistance to bending of the individual sheets forming stack 11 and the desired size of the supporting flat portion of the separating element. The direction of rotation may be either clockwise or counterclockwise.

In the embodiments of the apparatus according to the invention that have been described and portrayed, inner contact surfaces 12 of container 10 are vertical and perpendicular to the flat surfaces of separating element 22. Such an orientation of contact surface 12 relative to supporting element 22 need not be so in every case. Container 10 can also be designed in such a way that stack 11 is slanted. It is also possible to given an orientation deviating from the vertical to contact surfaces 30 of dispensing opening 16 of base 14.

Further imaginary axis 17 around which the container 10 and separating element 22 are rotated relative to one another need not run vertically. However, the imaginary axis must always be perpendicular to the flat surfaces of separating element 22. The latter can, however, have a position deviating from the horizontal. It has been demonstrated that the embodiments of the apparatus that have been described function perfectly even when they are inclined at an angle of nearly 90 degrees. This is particularly so for the embodiment in accordance with FIGS. 4 to 7, since ejection device 85 provides a sure and rapid dispensing of each separated sheet even when imaginary axis 17 is in a nearly horizontal position.

In a further modification of the embodiment shown in FIGS. 4 to 7, instead of or in addition to middle support 77, there can be provided two or more analogous supports which can be moved into and out of operating position depending on the relative rotation between container 10 and separating element 22. This provision permits the apparatus to receive and individually dispense sheets of especially large format. It is desirable for each of the analogous supports to be swivelly mounted on the side of base 14 for which screw bolts 80, cams, diagonally placed swivelling axes and the like can be provided in order to impart to the supports an additional motion component in the direction of the imaginary axis 17 during their swinging motion. Thus, while the supports are being swung into their operating position, the supports move towards the container and while swinging into their non-operating position they move away from the container so that any friction between the support and each bottom sheet of stack 11 is minimal.

What is claimed is:

1. Apparatus for separating a single sheet from a stack of several sheets having the same non-round shape and the same size, said apparatus comprising a container with a recess for holding the stack, a base located underneath the container having a dispensing opening, a separating element with an aperture for receiving the bottom sheet which is to be separated from the stack, said separating element being located between the container and the base and being essentially a flat disc, the thickness of which is smaller than the thickness of a single sheet of the stack, means for rotating the container relative to the separating element on an imaginary axis passing through the recess of the container, the dispensing opening of the base and the aperture of the separating element capable of separating each bottom sheet from the stack and conveying the separated sheet into the dispensing opening of the base, the recess of the container and the aperture of the separating element conforming essentially in shape and size to one another and being of the same shape and size of the sheets of the stack when viewed in the direction of the imaginary axis, and at least one support element beneath the separating element which can be moved into an operating position where the support element supports the bottom sheet of the stack into a non-operating position where the support element allows the bottom sheet to move from the aperture of the separating element into the dispensing opening of the base, the movement of the support element from the operating position to the non-operating position being coupled with the relative rotation between the separating element and the container.

2. Apparatus according to claim 1, wherein the support element comprises a slide plate, which, in its operating position is directly beneath the separating element and completely closes the aperture of the separating element and the dispensing opening of the base.

3. Apparatus according to claim 2, wherein the slide plate is manually actuated and is linked with the separating element such that the relative rotation between the separating element and the container can be accomplished through actuating the slide plate.

4. Apparatus according to claim 1, wherein the support element is an arm pivotally mounted on the base and the apparatus includes means for imparting a motion component to the arm in the direction of the imaginary axis during its pivoting motion in such that while the arm pivots from its operating position to its non-operating position, the arm moves at the same time in the direction away from the container.

5. Apparatus according to claim 1, wherein at least one of the contact surfaces of the recess of the container and the dispensing opening of the base have grooves that run essentially parallel to the imaginary axis.

6. Apparatus according to claim 1, wherein the container, at its side facing toward the separating element, has at least one ejection device for the automatic conveying of the sheet separated from the stack into the dispensing opening of the base.

7. Apparatus for separating a single sheet from a stack of several sheets having the same non-round shape and the same size, said apparatus comprising a container with a recess for receiving the stack, a base with a dispensing opening located underneath the container, a separating element with an aperture for receiving the bottom sheet to be separated from the stack, the separating element being located between the container and the base and being essentially a flat disc, the thickness of which is smaller than the thickness of a single sheet of the stack, means for rotating the container relative to the separating element around an imaginary axis passing through the recess of the container, the dispensing opening of the base and the aperature of the separating element capable of separating each bottom sheet from the pile and conveying the separated sheet into the dispensing opening of the base, the recess of the container and the aperture of the separating element conforming essentially in shape and size to one another and being of the same shape and size of the sheets of the stack when viewed in the direction of the imaginary axis, and at least one marking device adapted to make marks on at least the border of each bottom sheet of the stack, said marking device being located on the container outside the recess and which when viewed in the direction of the imaginary axis, is capable of moving within the contact surfaces of the aperture of the separating element by the relative rotation between the container and the separating element in the separation and dispensing process.

8. Apparatus according to claim 7, wherein the marking device includes a radiation source and at least one marking mask said device capable of making photographic marks in a light-sensitive layer of the bottom sheet of the stack.

* * * * *